(12) United States Patent  
Lee et al.

(10) Patent No.: US 8,984,066 B2  
(45) Date of Patent: Mar. 17, 2015

(54) APPARATUS AND METHOD FOR PROVIDING MESSAGE SERVICE

(75) Inventors: Eun-jung Lee, Dongjak-gu (KR); Young-ho Rhee, Gangnam-gu (KR); Young-kyu Jin, Gangnam-gu (KR); Joo-kyung Woo, Gangseo-gu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 818 days.

(21) Appl. No.: 11/650,550

(22) Filed: Jan. 8, 2007

(65) Prior Publication Data

US 2007/0180038 A1 Aug. 2, 2007

(30) Foreign Application Priority Data

Feb. 1, 2006 (KR) ........................ 10-2006-0009741

(51) Int. Cl.
*G06F 15/16* (2006.01)
*H04L 12/18* (2006.01)
*H04L 12/58* (2006.01)

(52) U.S. Cl.
CPC .......... *H04L 12/189* (2013.01); *H04L 12/5895* (2013.01); *H04L 51/38* (2013.01)
USPC ........................................ 709/206; 709/204

(58) Field of Classification Search
USPC ................................................. 709/206, 204
See application file for complete search history.

(56) References Cited

U.S. PATENT DOCUMENTS

| 5,878,230 | A | * | 3/1999 | Weber et al. | 709/238 |
| 6,252,588 | B1 | * | 6/2001 | Dawson | 715/752 |
| 2002/0099777 | A1 | * | 7/2002 | Gupta et al. | 709/206 |
| 2004/0044735 | A1 | * | 3/2004 | Hoblit | 709/206 |
| 2005/0060374 | A1 | * | 3/2005 | Phillips | 709/206 |
| 2005/0089006 | A1 | * | 4/2005 | Wang et al. | 370/349 |
| 2005/0108402 | A1 | * | 5/2005 | Colson et al. | 709/227 |

FOREIGN PATENT DOCUMENTS

| JP | 5-204795 | A | 8/1993 |
| JP | 2000-330892 | A | 11/2000 |
| JP | 2001-297051 | A | 10/2001 |
| JP | 2002-007387 | A | 1/2002 |
| JP | 2002-342240 | A | 11/2002 |
| JP | 2003-030182 | A | 1/2003 |
| JP | 2003-167826 | A | 6/2003 |
| JP | 2003263390 | A | 9/2003 |
| JP | 2004-164407 | A | 6/2004 |

(Continued)

OTHER PUBLICATIONS

Office Inquiry issued May 31, 2011 in counterpart Japanese Application No. 2007-012714.

(Continued)

*Primary Examiner* — Dustin Nguyen
*Assistant Examiner* — Joel Mesa
(74) *Attorney, Agent, or Firm* — Sughrue Mion, PLLC

(57) ABSTRACT

An apparatus and method for providing a message service are provided. The apparatus includes an input unit through which a user inputs a message and a list of recipients who will receive the message; a transmitter multicasting the message input by the user and identification information of the user to the recipient in the list; a receiver receiving answer messages from the recipients in the list; and a packet generating unit generating a combined message by combining the received answer messages with the message input by the user.

15 Claims, 13 Drawing Sheets

(56) References Cited

FOREIGN PATENT DOCUMENTS

| | | | |
|---|---|---|---|
| JP | 2004334505 A | 11/2004 | |
| KR | 10-2004-0074705 A | 8/2004 | |
| KR | 10-2004-0100117 A | 12/2004 | |
| KR | 10-2005-0006575 A | 1/2005 | |
| KR | 10-2005-0008327 A | 1/2005 | |
| KR | 10-2005-0087120 A | 8/2005 | |
| KR | 10-2005-0101881 A | 10/2005 | |
| WO | 2005/025242 A2 | 3/2005 | |

OTHER PUBLICATIONS

Communication dated Nov. 8, 2011 issued by the Japanese Patent Office in counterpart Japanese Patent Application No. 2007-012714.

* cited by examiner

FIG. 3B

| USER GROUP SELECTION | |
|---|---|
| ☑ | Sue<br>010-111-1234 |
| ☑ | Peter<br>010-333-1234 |
| ☑ | Aimee<br>010-222-5678 |
| ☐ | Annie<br>010-444-1220 |
| ☐ | Andrew<br>010-111-0326 |
| ✶ | SELECTION/ DESELECTION |
| UPPER MENU | CONFIRMATION |

FIG. 3C

HAPPY BIRTHDAY~!
I SUPPOSE YOU TO MISS ME.
I SEND MY PICTURE AS A
BIRTHDAY PRESENT AND
WISH YOU TO ENJOY IT.

JANUARY 2, 2006, 12:20 PM

UPPER MENU | CONTENT ATTACHMENT

FIG. 5G

| RECIPIENTS | |
|---|---|
| ☑ Sue<br>010-111-1234 | 611 |
| ☐ Peter<br>010-333-1234 | 612 |
| ☐ Aimee<br>010-222-5678 | 613 |
| ☐ Joe<br>010-444-5678 | 614 |
| ✳ SELECTION/DESELECTION | |
| UPPER MENU      TRANSMISSION | |

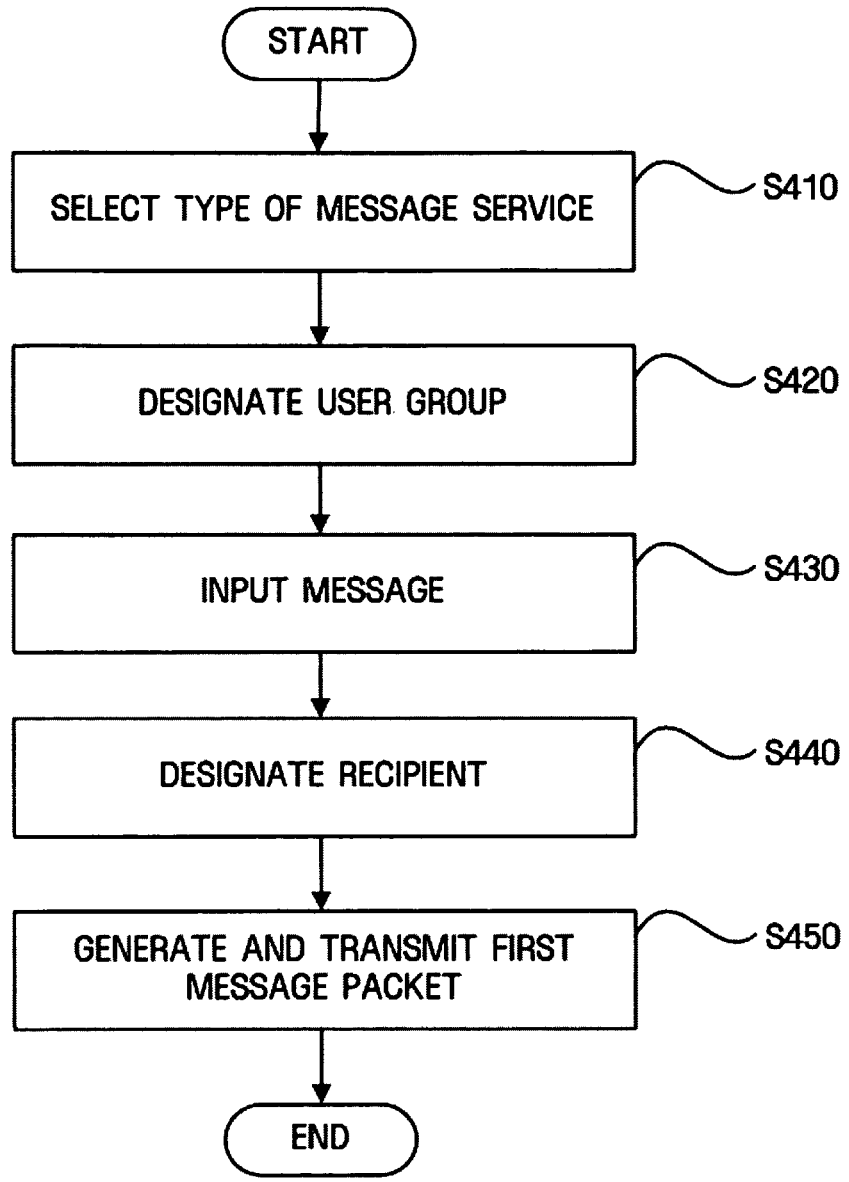

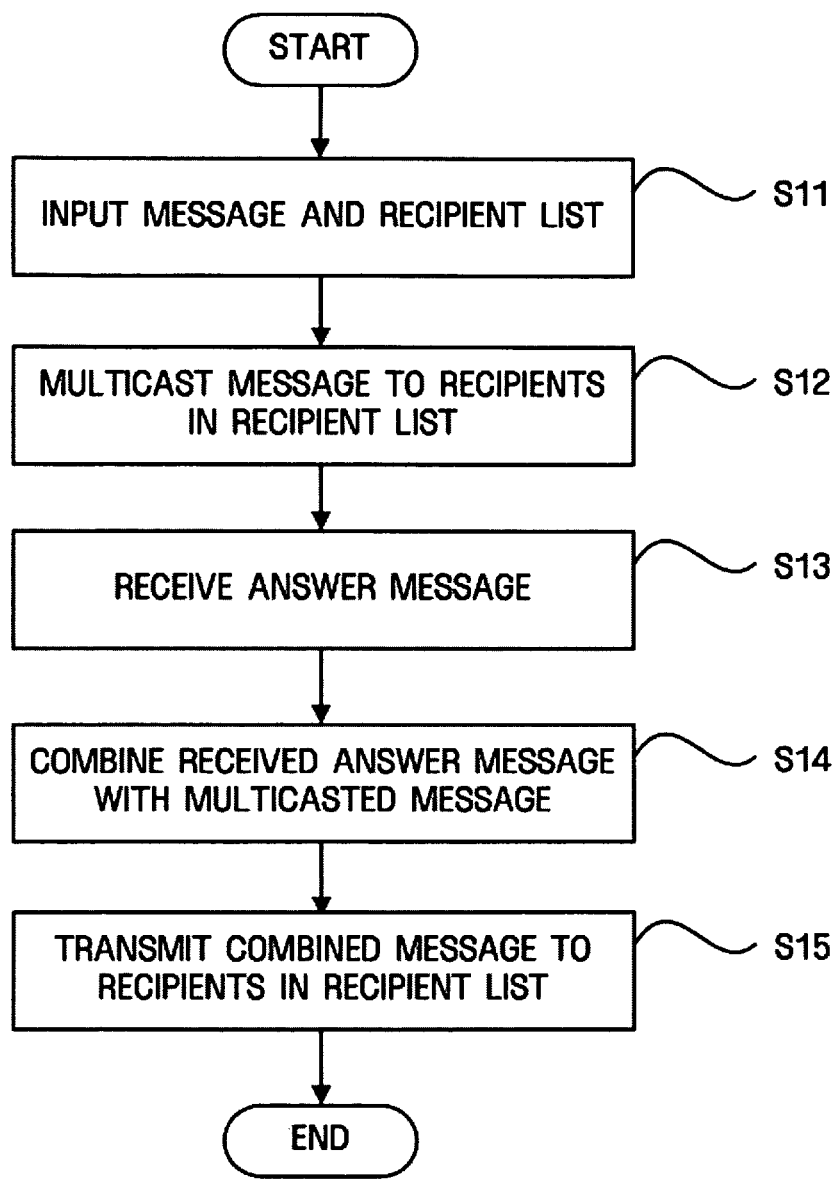

APPARATUS AND METHOD FOR PROVIDING MESSAGE SERVICE

CROSS REFERENCE TO RELATED APPLICATION

This application claims priority from Korean Patent Application No. 10-2006-0009741 filed on Feb. 1, 2006 in the Korean Intellectual Property Office, the disclosure of which is incorporated herein by reference in its entirety.

BACKGROUND OF THE INVENTION

1. Field of the Invention

Apparatuses and methods consistent with the present invention relate to providing a message service, and more specifically, to providing a message service in which a plurality of users cowrite and share a message.

2. Description of the Related Art

The use of a message service is increasing along with the widespread use of portable digital apparatuses such as PDAs and cellular phones. The message services are mainly classified into a short/long message service and a multimedia message service.

The short/long message service (SMS/LMS) is a text service that permits a user to send and receive a text composed of about forty letters. The multimedia message service (MMS) is a text service that permits a music file, a voice file, and an animation file, such as a still image file and a video file, to be attached to a short/long message.

A method of using the message service is as follows. First, a user writes a message by using a terminal and inputs receiver information. When the input of the receiver information is completed, the message is transferred from the terminal of the sender to a terminal of the receiver through a base station. If information on a plurality of receivers is input in the stage in which the receiver information is input, the same message is transferred to the plurality of users. Meanwhile, the receiver can transmit an answer message in response to the received message to the senders. Users can exchange information and make an appointment with each other through the above-mentioned process.

However, in a message service according to the related art, a message written by a specific user is unilaterally transferred to one or more receivers, but the related art does not provide a service that permits a plurality of users to cowrite and share a message. For this reason, various inventions (for example, "GROUP PROMISE SERVICE METHOD USING SHORT MESSAGE FOR SCHEDULER OF MOBILE COMMUNICATION TERMINAL" disclosed in Korean Patent Publication No. 10-2005-0008327) have been proposed, but the above-mentioned problem has not been solved yet.

Therefore, it is necessary to provide an apparatus and method for providing a message service that permits a plurality of users to cowrite and share a message.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides a message service providing apparatus including a reception unit which receives a first message packet including a message input by a first user and a list of recipients who will receive the message; an input unit through which a second user inputs a message; a packet generating unit which generates a second message packet by adding the message input by the second user to the message input by the first user; and a transmission unit which transmits the second message packet to a recipient selected from the list of recipients.

Another aspect of the present invention provides a message service providing apparatus including an input unit through which a user inputs a message and a list of recipients who will receive the message; a transmission unit which multicasts the message input by the user and identification information of the user to the recipient in the list; a reception unit which receives answer messages from the recipients in the list; and a packet generating unit generating a combined message by combining the received answer messages with the message input by the user.

Still another aspect of the present invention provides a method of providing a message service including receiving a first message packet including a message input by a first user and a list of recipients who will receive the message; when a second user inputs a message, generating a second message packet by adding the message input by the second user to the message input by the first and transmitting the second message packet to a recipient selected from the list of recipients.

According to yet another aspect of the present invention, a method of providing a message service includes when a user input a message and a list of recipients who will receive the message, multicasting the message input by the user and identification information of the user to the recipient in the list; receiving answer messages from the recipients in the list; and generating a combined message by combining the received answer messages with the message input by the user.

BRIEF DESCRIPTION OF THE DRAWINGS

The above and other aspects of the present invention will become more apparent by describing in detail exemplary embodiments thereof with reference to the attached drawings, in which:

FIGS. 3A to 3D are views showing examples displayed on a screen of the first message service providing apparatus shown in FIG. 2;

FIGS. 5A to 5G are views showing examples displayed on a screen of the second message service providing apparatus shown in FIG. 4;

FIG. 6 is a flow chart illustrating a sequence of operations of the first message service providing apparatus shown in FIG. 2;

FIG. 10 is a flow chart illustrating a sequence of operations of the first message service providing apparatus shown in FIG. 9.

DESCRIPTION OF THE EXEMPLARY EMBODIMENTS OF THE INVENTION

Figure 1:
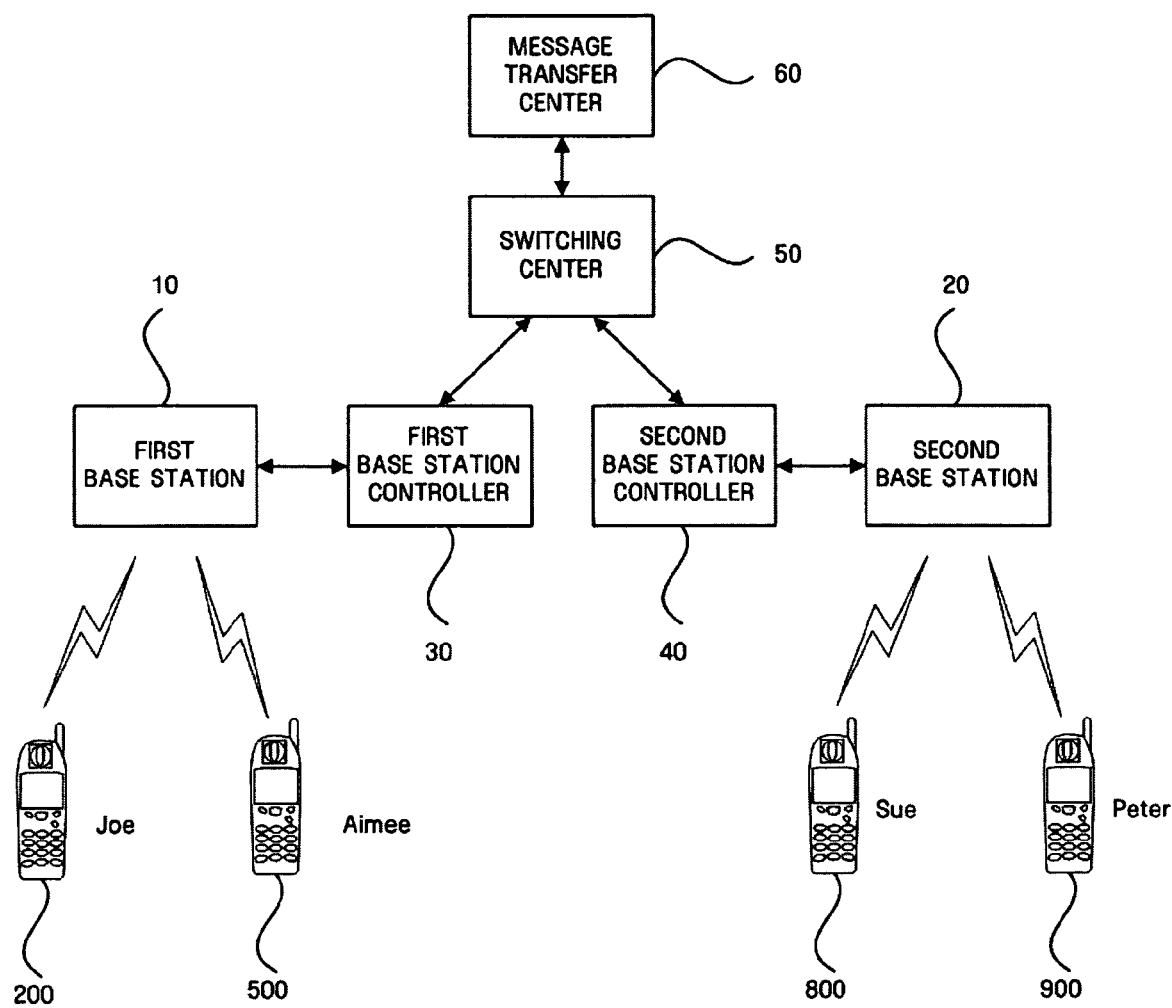
FIG. 1 is a view showing an example of a communication system according to an exemplary embodiment of the present invention.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will be defined by the appended claims. Like reference numerals refer to like elements throughout the specification.

Hereinafter, message service providing apparatuses and methods of providing a message service according to exemplary embodiments of the invention will be described with reference to the accompanying block diagrams and flowcharts. It will be understood that each block of the flowchart illustrations, and combinations of blocks in the flowchart illustrations, can be implemented by computer program instructions.

These computer program instructions can be provided to a processor of a general purpose computer, special purpose computer, or other programmable data processing apparatus to produce a machine, such that the instructions, which execute, via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

FIG. 1 is a view showing an example of a communication system according to an exemplary embodiment of the present invention. The communication system shown in FIG. 1 includes a plurality of message service providing apparatuses 200, 500, 800, and 900, a plurality of base stations 10 and 20, a plurality of base station controllers 30 and 40, a switching center 50, and a message transfer center 60.

The message service providing apparatuses 200, 500, 800, and 900 provide a common message service. Here, the common message service is a service permitting that a message input by a user is combined with a message written by a first sender and the combined message is transferred to another user in a designated user group. Here, a user group can be designated by the first sender, and the user can select the next user to receive the combined message from the designated user group. At this time, the message is transferred in the designated user group in a relay manner. The combined message is transferred together with information on the user group designated by the first user. Hereinafter, for convenience of explanation, a case in which the designated user group includes first to fourth message service providing apparatuses 200, 500, 800, and 900, and a message first written in the first message service providing apparatus 200 is transferred to the third message service providing apparatus 800 through the second message service providing apparatus 500 will be described as an example. The users of the apparatuses are assumed to Joe, Aimee, Sue, and Peter, respectively. The first and second message service providing apparatuses 200 and 500 will be described below in detail with reference to FIGS. 2 to 5G The base stations 10 and 20 convert a signal format of a radio link into a signal format suitable for a wire link and provide messages provided by the message service providing apparatuses to the switching center 50. Further, the base stations 10 and 20 measure the transmission/reception field strength (electric wave reception strength) of each message service providing apparatus and provides the measured transmission/reception field strength to the switching center 50. Furthermore, the base station 10 or 20 controls signal transmission and reception of message service providing apparatuses in a cell managed by the corresponding base station 10 or 20 and manages radio channels in the corresponding base station 10 or 20.

The base station controllers 30 and 40 manage the base stations 10 and 20, respectively. In other words, the base station controllers 30 and 40 perform functions, such as management of the service state of hardware and software of the base stations 10 and 20, assignment and construction of resources for call traffic, acquirement of information on the application of the base stations 10 and 20, monitoring of a client apparatus related to the application, monitoring, and failure of the base stations 10 and 20.

The switching center 50 provides a circuit switching service to the plurality of base station controller 30 and 40 and the message service providing apparatuses. Also, the switching center 50 additionally has a channel handoff function.

The message transfer center 60 processes a message transferred by a predetermined message service providing apparatus in a hardware or software manner and standardizes the message into a form suitable for transferring the message to a receiver-side message service providing apparatus. Then, the message transfer center 60 provides the standardized message to the switching center 50.

Next, the first message service providing apparatus 200 according to an exemplary embodiment of the present invention will be described with reference to FIGS. 2 to 3D. Here, FIG. 2 is a block diagram showing the construction of the first message service providing apparatus 200 in the communication system shown in FIG. 1, and FIGS. 3A to 3D are views showing examples displayed on a screen of the first message service providing apparatus 200 shown in FIG. 2.

First, the first message service providing apparatus 200 may be composed of a digital apparatus. Here, the digital apparatus is an apparatus having a digital circuit for processing digital data. Examples of the digital apparatus include a computer, a printer, a digital camera, a facsimile, a digital copier, a digital appliance, a digital phone, a digital projector, a home server, a digital video recorder, a set-top box, a personal digital assistant (PDA), a notebook computer, and a cellular phone.

Figure 2:
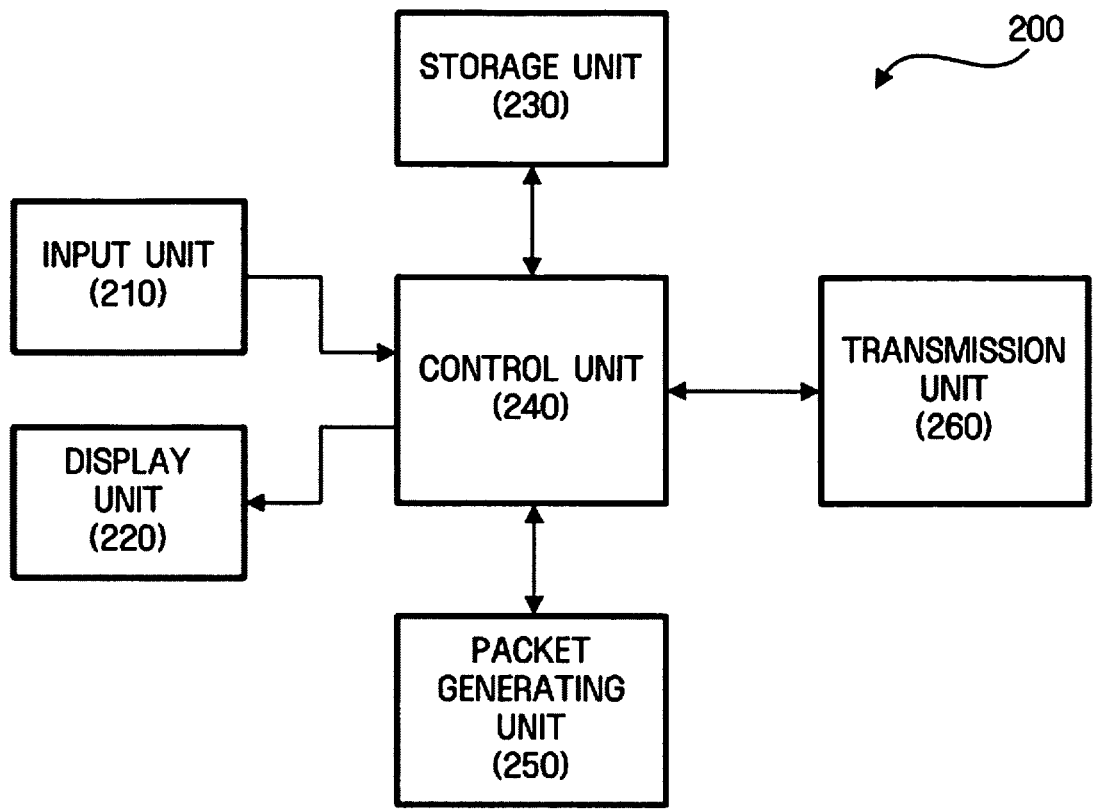
FIG. 2 is a block diagram showing the construction of a first message service providing apparatus in the communication system shown in FIG. 1.
Figure 3A:
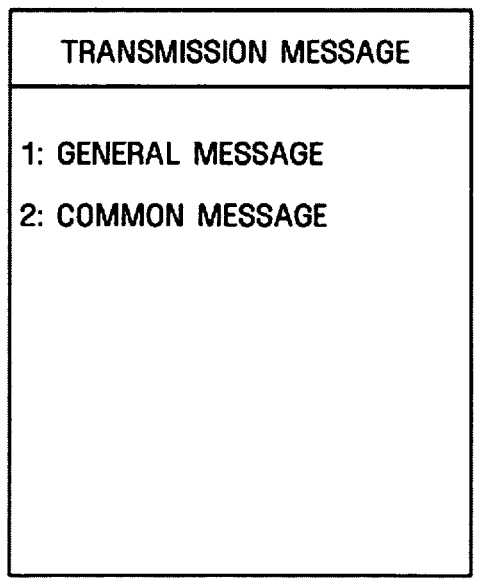
Figure 3D:
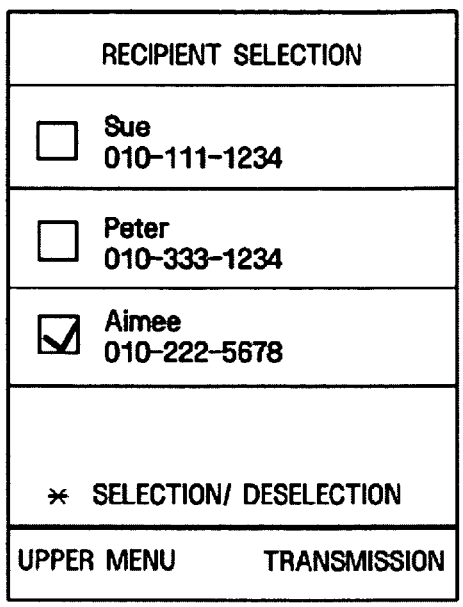

More specifically, the first message service providing apparatus 200 includes an input unit 210, a storage unit 230, a display unit 220, a packet generating unit 250, a control unit 240, and a transmission unit 260, as shown in FIG. 2.

The input unit 210 serves to receive a user's instruction. For example, a first user can input an instruction to select the type of message service to the input unit 210. Although not shown, the input unit 210 can include a plurality of functional keys, for example, a menu key for displaying a menu list related to the message service, directional keys for selecting a menu, an execution key for executing the selected menu, and a plurality of letter input keys for inputting letters. The functional keys of the input unit 210 generate predetermined key signals when pushed by a user, and the generated signals are provided to the control unit 240, which will be described below.

The storage unit 230 stores user's identification information related to the other message service providing apparatuses 500, 800, and 900. Here, examples of the user identification information include a user's name or nickname, a still image, and a phone number. Also, the storage unit 230 can store, for example, a voice file, a music file, a still image file, and a video file. The storage unit 230 may be composed of at least one of nonvolatile memory devices, such as caches, ROMs (Read Only Memories), PROMs (Programmable ROMs), EPROMs (Erasable Programmable ROMs), EEPROMs (Electrically Erasable Programmable ROMs), and flash memories, volatile memory devices, such as RAMs (Random Access Memories), and HDDs (Hard Disk Drives), but is not limited thereto.

The display unit 220 visually displays the instruction process result according to the input key signals. For example, when a key signal for displaying the menu list related to the message service is provided to the display unit 220, the display unit 220 displays the menu list related to the message service. The display unit 220 may be formed to be separate from the input unit 210 in a hardware construction and may be combined with the input unit 210 into a touch screen.

The packet generating unit 250 generates a first message packet. Here, the first message packet includes a message input by the first user, and identification information on users who can receive the message input by the first user and combine a new message with the received message (hereinafter, the identification information on users is referred to as a user list). Here, at least one of predetermined contents, for example, a voice file, a music file, a still image file, and a video file can be attached to the message input by the first user.

The transmission unit 260 transmits the first message packet generated by the packet generating unit 250 to the second message service providing apparatus 500. When predetermined contents, for example, a voice file, a music file, a still image file, and a video file are attached to the message, the transmission unit 260 transmits the contents together with the message to the second message service providing apparatus 500.

The control unit 240 controls the components of the first message service providing apparatus 200 according to the type of key signal supplied by the input unit 210. More specifically, when the key signal for displaying the menu list related to the message service is provided to the control unit 240, the control unit 240 controls the display unit 220 to display the menu related to the message service, as shown in FIG. 3A. When a common message menu of FIG. 3A is selected, the control unit 240 controls the display unit 220 to display a screen for inputting the user list, as shown in FIG. 3B. After the user list is input, the control unit 240 controls the display unit 220 to sequentially display a screen on which the first user inputs a message and a screen on which information on the called party to receive the first message packet is input, as shown in FIGS. 3C and 3D.

Figure 4:
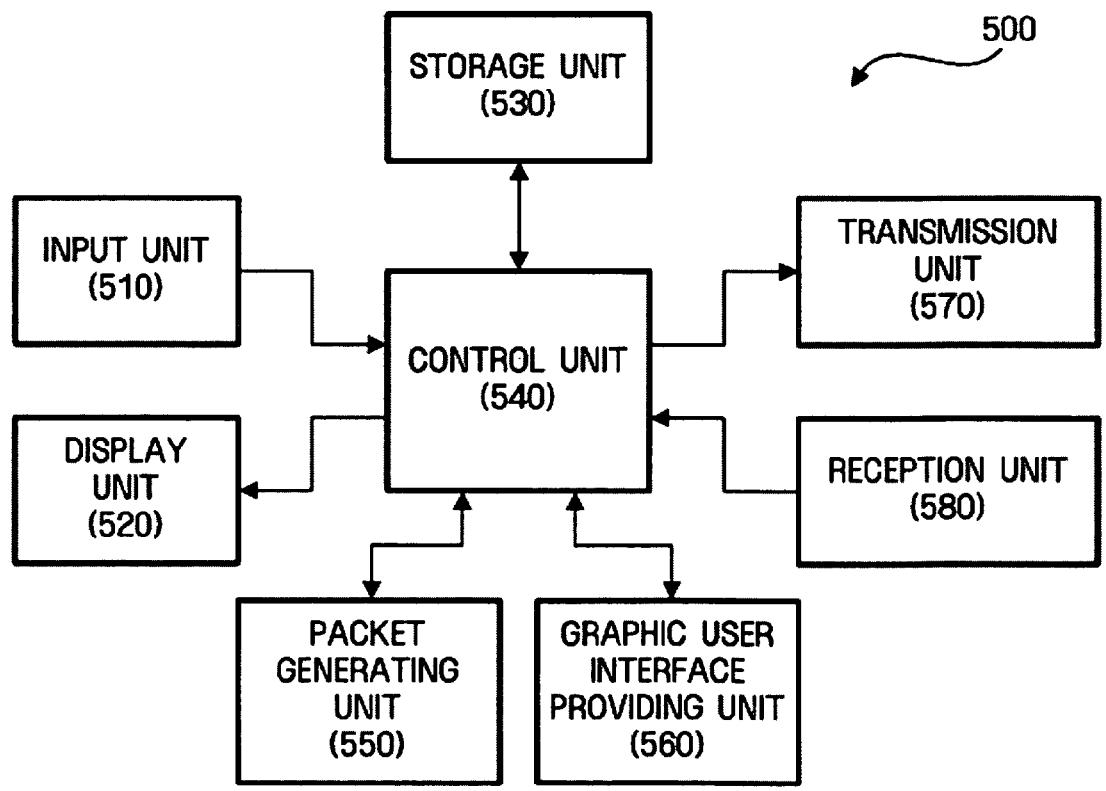
FIG. 4 is a block diagram showing the construction of a second message service providing apparatus in the communication system shown in FIG. 1.
Figure 5A:
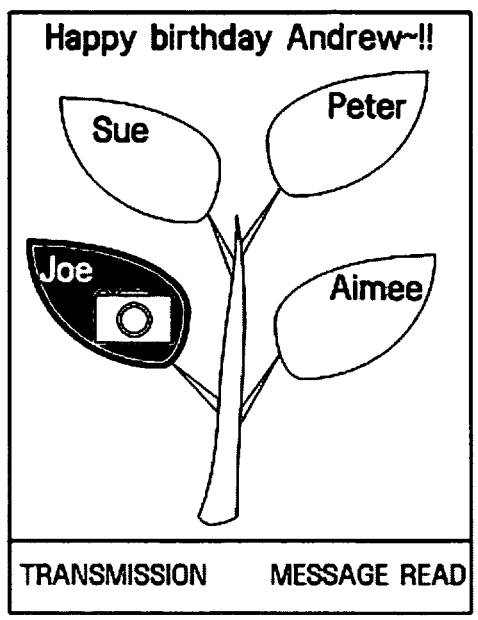
Figure 5B:
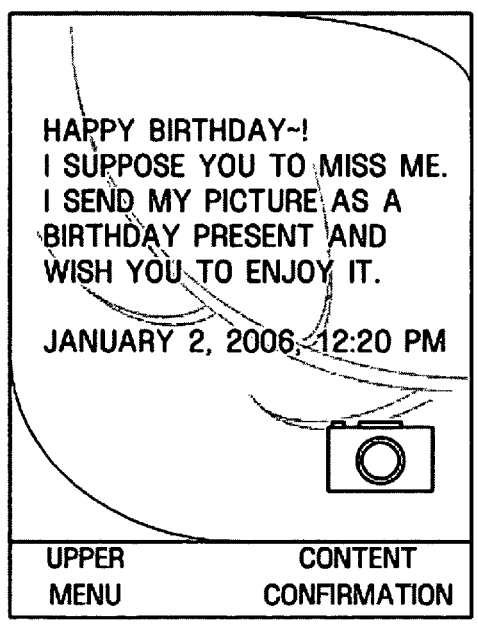

Next, the second message service providing apparatus 500 will be described with reference to FIGS. 4 to 5G FIG. 4 is a block diagram showing the construction of the second message service providing apparatus 500, and FIGS. 5A to 5G are views showing examples displayed on a screen of the second message service providing apparatus 500 shown in FIG. 4.

Referring to FIG. 4, the second message service providing apparatus 500 includes an input unit 510, a display unit 520, a storage unit 530, a graphic user interface providing unit 560, a packet generating unit 550, a control unit 540, a reception unit 580, and a transmission unit 570.

The input unit 510 is for inputting a user's instruction. For example, a second user inputs a message by using the input unit 510. The input unit 510 includes a plurality of functional keys for inputting a message. For example, the input unit 510 includes a plurality of letter keys for inputting letters, a selection key for selecting a menu, an execution key for executing the selected menu. The functional keys of the input unit 510 generate predetermined key signals when pushed by a user.

The reception unit 580 receives the first message packet from the first message service providing apparatus 200. The received first message packet is provided to the control unit 540.

The control unit 540 analyzes the first message packet and provides the analysis result to the graphic user interface providing unit 560. As a result, the control unit 540 controls the display unit 520 to display a user interface including summary information related to the first message packet, for example, identification information of the message writer and identification information of the attached content.

Further, the control unit 540 controls access to the received message. More specifically, the control unit 540 allows the second user to confirm the message written by the first user, but does not allow the second user to change or delete the content of the message written by the first user or to add a new content to the message written by the first user.

Furthermore, the control unit 540 connects and manages the components of the second message service providing apparatus 500. For example, when the control unit 540 receives the first message packet through the reception unit 580, the control unit 540 controls the display unit 520 to display a mark notifying that the first message packet is received.

The graphic user interface providing unit 560 provides a graphic user interface related to the first message packet on the basis of the analysis result provided by the control unit 540. More specifically, the graphic user interface providing unit 560 generates a graphic object corresponding to each user on the basis of identification information of the calling party and the user list included in the first message packet. For example, the graphic user interface providing unit 560 generates four leaf-shaped graphic objects that correspond to the first to fourth users, respectively. Then, the graphic user interface providing unit 560 provides, through the generated graphic objects, for example, information on whether content is attached to the message, information on whether there is a message written by each user, and the identification information of the individual users included in the user list.

Here, the information on whether there is a message written by each user can be provided through attributes of each graphic object, such as color or transparency. That is, when there is a message written by a user corresponding to a predetermined graphic object, the surface of the corresponding graphic object can be displayed in green. On the other hand, when there is no message written by a user corresponding to a predetermined graphic object, the surface of the corresponding graphic object can be displayed in white. More specifically, the first message packet includes only messages input by the first user. Therefore, the surface of the graphic object corresponding to the first user can be displayed in green, and the surfaces of the leaf-shaped graphic objects corresponding to the second to fourth users can be displayed in white.

Further, when any content is attached to a message input by a specific user, identification information on the type of content attached to the message can be provided by displaying an icon representing the type of content on the surface of the graphic object corresponding to the specific user. For example, when a still image file is attached to a message input by the first user, for example, a camera-shaped icon can be displayed on the surface of the graphic object corresponding to the first user. When a music file is attached to a message input by the first user, a musical-note-shaped icon can be displayed on the surface of the graphic object corresponding to the first user.

The display unit 520 visibly displays the instruction process result. For example, the display unit 520 displays a graphic user interface related to the common message service, as shown in FIG. 5A.

The storage unit 530 stores the first message packet and contents attached to a message input by the second user, such as a voice file, a music file, a still image file, and a video file,. The storage unit 530 may be composed of at least one of nonvolatile memory devices, such as caches, Read Only Memories (ROMs), Programmable ROMs (PROMs), Erasable Programmable ROMs (EPROMs), Electrically Erasable Programmable ROMs (EEPROMs), and flash memories, volatile memory devices, such as Random Access Memories (RAMs), and Hard Disk Drives (HDDs), but is not limited thereto.

When the second user inputs a message, the packet generating unit 550 generates a second message packet by combining the message input by the second user with the message included in the first message packet.

The transmission unit 570 transmits the second message packet generated by the packet generating unit 550 to another message service providing apparatus in the system, for example, the third message service providing apparatus 800.

The second message service providing apparatus 500 may further include a player (not shown) that plays content attached to the message input by the first user or content stored in the storage unit 530.

Next, the operation of the first message service providing apparatus 200 according to the exemplary embodiment of the present invention will be described with reference to FIGS. 3A to 3D and FIG. 6. FIG. 6 is a flow chart showing a sequence of operations of the first message service providing apparatus 200.

The operations of the first message service providing apparatus 200 for providing a common message service includes the operation of: when a first user selects the type of message service (S410), designates a list of recipients who will receive the message input by the first user and participate in writing a common message (S420), inputs a message (S430), and inputs identification information of a person who will receive the message input by the first user in the user list (S440), transmitting a first message packet including the user list and the message input by the first user (S450).

First, the first user selects the type of message service in the first message service providing apparatus 200 (S410). In operation S410, the user can select, for example, the common message service from the menu list as shown in FIG. 3A.

After the common message service is selected, the first user inputs to the first message service providing apparatus 200 a list of users to participate in writing a common message (S420). For example, as shown in FIG. 3B, the first user inputs identification information of the second to fourth users.

When the user list is input, the first user inputs a message to the first message service providing apparatus 200, as shown in FIG. 3C (S430). When inputting the message, the first user may input the title of the message. In this operation, the first user may attach, to the message, contents stored in the storage unit 230, such as a voice file, a music file, a still image file, and a video file. The content may be stored in a separate server from the storage unit 230 of the first message service providing apparatus 200. In this case, positional information of the content may be attached to the message. Alternatively, in the operation of inputting a message, only content may be attached.

When the message input is completed, the first user inputs identification information of a user who will receive the message input by the first user and the user list (S440).

When a key signal for transmitting the message after the identification information of the user who will receive the message input by the first user and the user list is input, the packet generating unit 550 generates a first message packet including the message input by the first user and the user list. The first message packet generated by the packet generating unit 550 is transmitted together with the identification information of the first user to the second message service providing apparatus 500 through the transmission unit 260 (S450).

Figure 7:
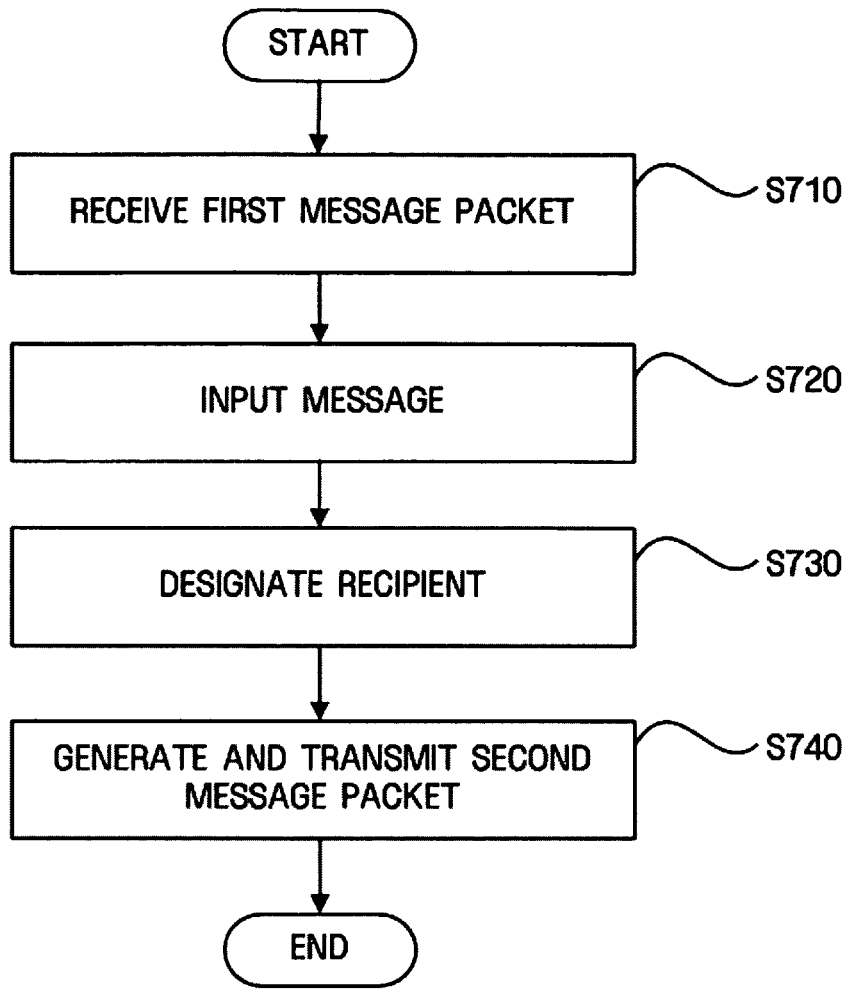
FIG. 7 is a flow chart illustrating a sequence of operations of the second message service providing apparatus shown in FIG. 4.

Next, the operation of the second message service providing apparatus 500 will be described with reference to FIGS. 5A to 5G and FIG. 7. FIG. 7 is a flow chart illustrating a sequence of operations of the second message service providing apparatus 500.

The sequence of operations of the second message service providing apparatus 500 mainly includes an operation of receiving the first message packet (S710), an operation of combining a message input by the second user with the message written by the first user (S720), an operation in which the second user designates a user who will receive the combined message from the user list (S730), and an operation of generating and transmitting a second message packet including the combined message and the user list (S740).

The reception unit 580 of the second message service providing apparatus 500 performs the operation of receiving the first message packet (S710). When the reception unit 580 receives the first message packet, the control unit 540 of the second message service providing apparatus 500 controls the display unit 520 to display a graphic object indicating that the message is received, for example, an envelope-shaped graphic object. Then, when a signal for confirming the content of the received message packet is input, the control unit 540 analyzes the first message packet and provides the analysis result to the graphic user interface providing unit 560.

The graphic user interface providing unit 560 forms a user interface including the summery information of the first message packet on the basis of the analysis result provided by the control unit 540. More specifically, the graphic user interface providing unit 560 generates a graphic object for each user on the basis of the user list and the identification information of a sender included in the first message packet. For example, the graphic user interface providing unit 560 generates leaf-shaped graphic objects corresponding to the first to fourth users.

Subsequently, the graphic user interface providing unit 560 displays, through each graphic object, identification information of the users, information on whether there is a message, and information on whether content is attached to the message.

The information on whether there is a message may be supplied through the attributes of the graphic object, such as color or transparency. For example, the surface of the graphic object corresponding to the first user of the first message packet can be displayed in green, and the surfaces of the graphic objects corresponding to the second to fourth users who do not participate in the writing of the message yet can be displayed in white.

The information on whether content is attached to a message can be supplied through an icon. That is, when content is attached to a message written by a specific user, an icon representing the type of content is displayed on the surface of the corresponding graphic object. For example, when an image file is attached to a message written by the first user, the graphic user interface providing unit 560 makes a camera-shaped icon to be displayed on the surface of the graphic object corresponding to the first user.

As a result, the graphic user interface shown in FIG. 5A can be displayed. When the graphic user interface providing unit 560 makes a user interface related to the first message packet to be displayed as shown in FIG. 5A, it accentuates the graphic object selected by the second user, and the control unit 540 provides a menu with respect to the graphic object selected by the second user.

Figure 5C:
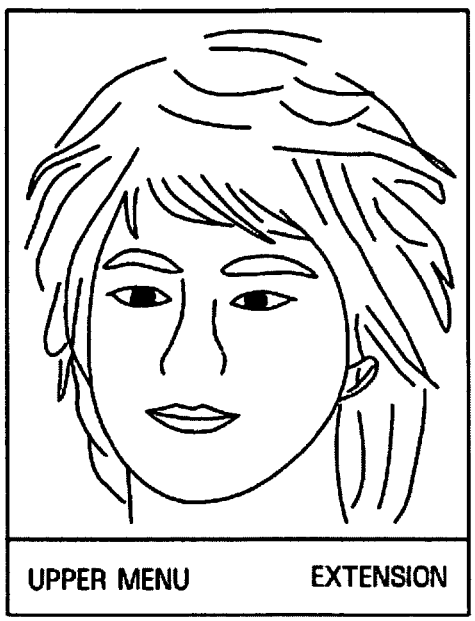

In this stage, the second user may confirm the content of the message input by the first user or input a new message (S720). More specifically, when the graphic object corresponding to the first user is brought into focus, a menu for allowing the second user to confirm the content of the message is provided as shown in FIG. 5A. At this time, when a signal for confirming the content of the message is provided, the graphic user interface providing unit 560 enlarges the graphic object corresponding to the first user and makes the details of the message to be displayed. In this state, when a signal for confirming the content attached to the message, the display unit 520 displays the content attached to the message input by the first user, as shown in FIG. 5C.

Figure 5D:
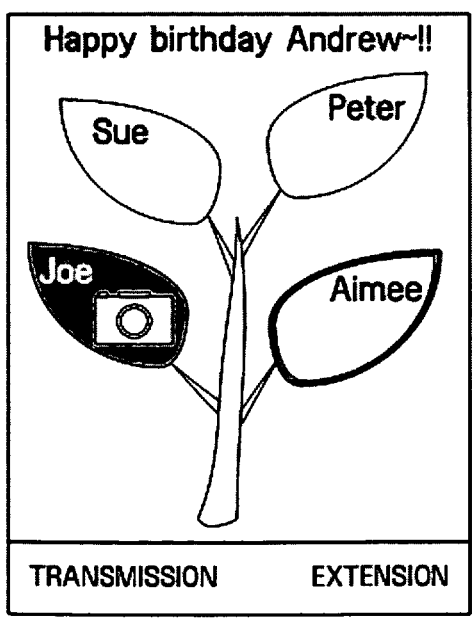
Figure 5E:
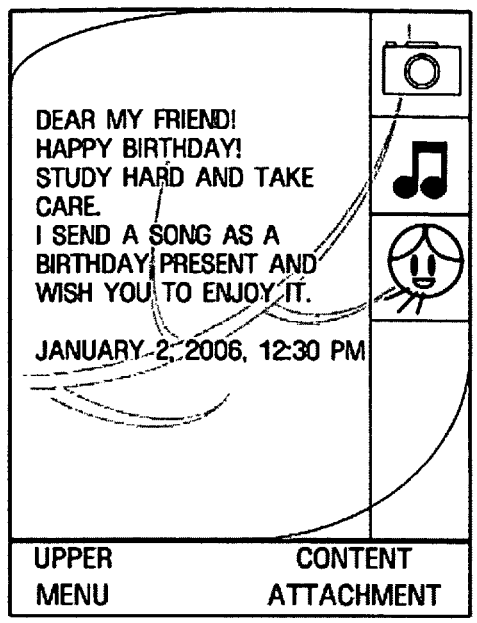

When the graphic object corresponding to the second user in the user interface as shown in FIG. 5A is brought into focus, a menu for allowing the second user to input a new message is provided as shown in FIG. 5D. At this time, the second user can select the menu for inputting a new message and input a message as shown in FIG. 5E (S720). In this stage, the second user may attach content stored in the storage unit 530 to the new message. Alternatively, the second user may attach content stored in a separate server to the new message. In this case, information on the location at which the content is stored is attached to the message.

Figure 5F:
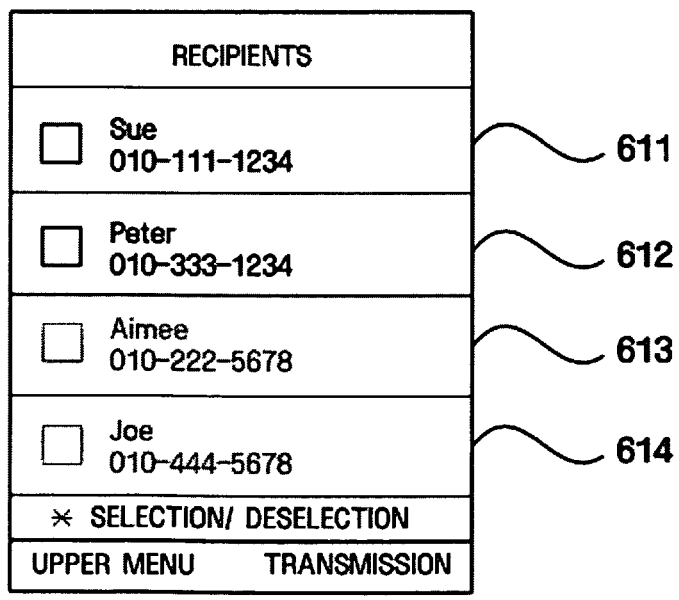

After the second user inputs the new message, the display unit 520 displays the user list included in the first message packet as shown in FIG. 5F. At this time, the identification information of the sender of the first message packet, that is, the first user is displayed together with the user list. The identification information of the individual users, such as an image, an icon, a phone number, and name, is displayed on a plurality of separate regions in the user list. At this time, regions 614 and 613 where the identification information items of the first and second users are recorded, respectively, are inactivated.

When the user list is displayed as described above, the second user can select a user who will receive the message input by the first user and the message input by the second user (S730).

When the user who will receive the message input by the first user and the message input by the second user is selected, a second message packet including the message input by the first user, the message input by the second user, and the user list is generated. Then, when a signal instructing the second message packet to be transmitted is input, the second message packet is transmitted to the third message service providing apparatus 800 through the transmission unit 570 (S740).

Figure 8A:
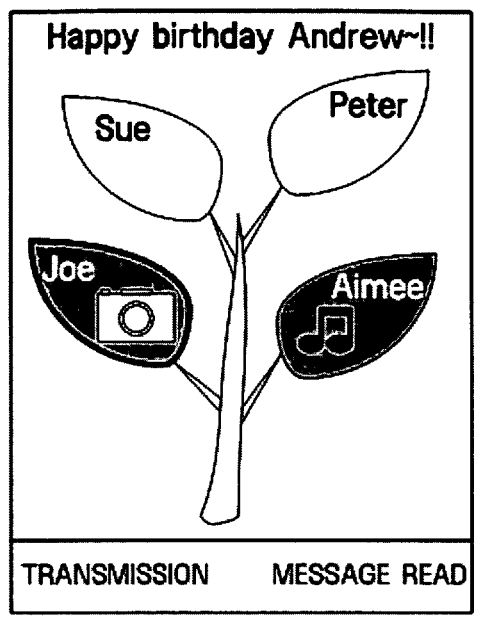
FIGS. 8A and 8B are views showing examples displayed on a screen of a third message service providing apparatus in the communication system shown in FIG. 1.
Figure 8B:
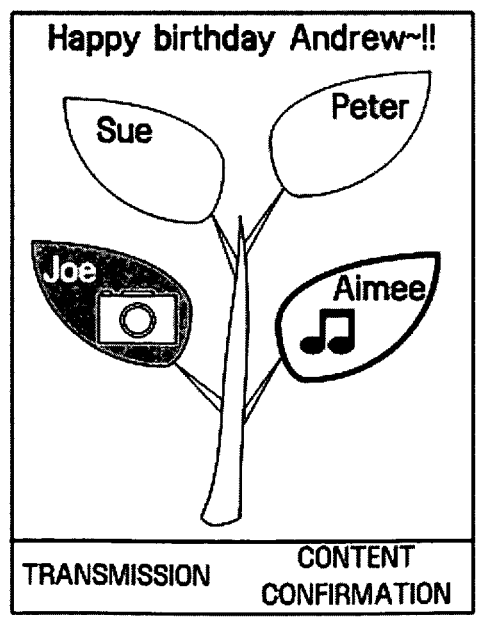

The third message service providing apparatus 800 may has substantially the same construction as the second message service providing apparatus 500. The third message service providing apparatus 800 provides a user interface related to the second message packet through a sequence of operations similar to that in the second message service providing apparatus 500. FIGS. 8A and 8B are views showing examples displayed on the screen of the third message service providing apparatus 800. More specifically, FIG. 8A shows that the second message packet includes the message input by the second user and a music file is attached as content to the message input by the second user, and FIG. 8B shows that the second message packet includes only a music file attached as content, without any message input by the second user.

In the above-mentioned message service providing apparatus and the method, the first message service providing apparatus 200 and the second message service providing apparatus 500 are functionally separated from each other. However, the first message service providing apparatus 200 may selectively include the components of the second message service providing apparatus 500, and the second may selectively include the components of the first message service providing apparatus 200.

Figure 9:
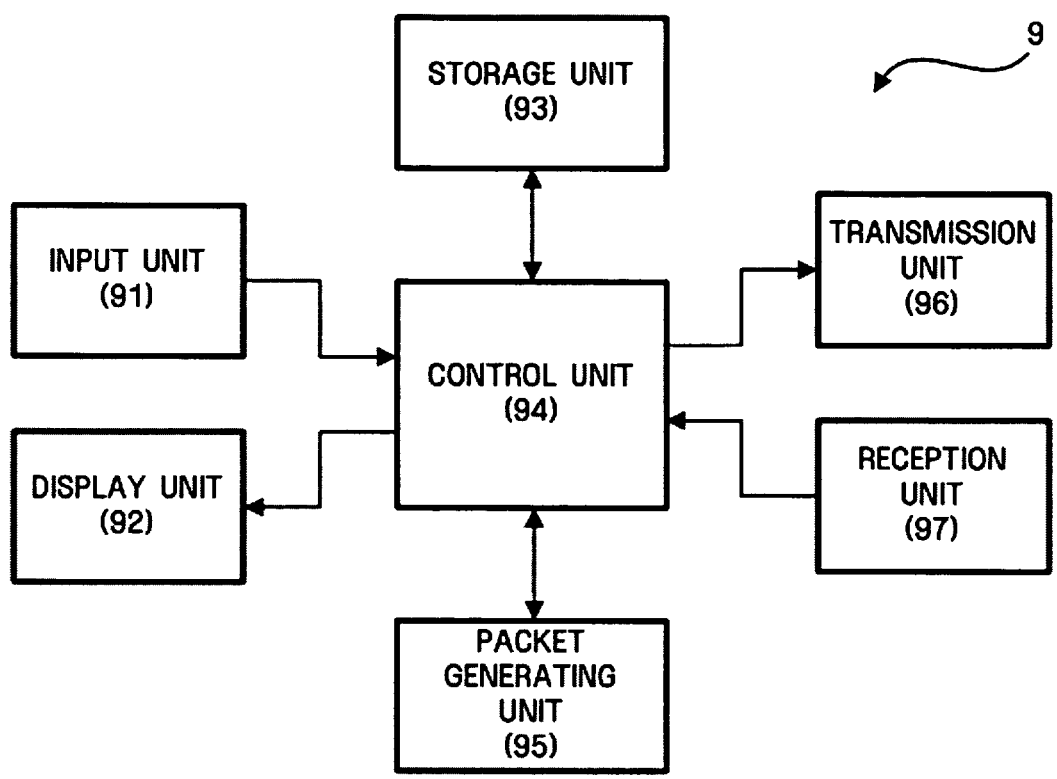
FIG. 9 is a block diagram showing the construction of a first message service providing apparatus according to a second exemplary embodiment of the present invention.

Next, a first message service providing apparatus 9 according to a second exemplary embodiment of the invention will be described with reference to FIGS. 9 and 10. FIG. 9 is a block diagram showing the construction of the first message service providing apparatus 9 according to the second exemplary embodiment of the invention, and FIG. 10 is a flow chart showing the operation of the first message service providing apparatus 9 according to the second exemplary embodiment.

First, referring to FIG. 9, the first message service providing apparatus 9 according to the second exemplary embodiment of the invention has the same construction as the first message service providing apparatus 200 according to the first exemplary embodiment of the invention except for a reception unit 97. That is, the first message service providing apparatus 9 includes the reception unit 97 in addition to the components of the first message service providing apparatus 200 shown in FIG. 2.

More specifically, a first user inputs a message through an input unit 91. The first user designates a group of user who will receive the message.

A packet generating unit 95 generates a first message packet including the input message and the identification information of the first user. Also, when receiving an answer message to the first message packet from a list of recipients who will receive the message, the packet generating unit 95 combines the received answer message with the first message packet to generate a second message packet.

A transmission unit 96 serves to multicast the first message packet generated by the packet generating unit 95 to recipients in the recipient list. Also, the transmission unit 96 serves to multicast the second message packet generated by the packet generating unit 95 to the recipients in the user list. At the time of multicasting, the second message packet can be transmitted to only the recipients selected by the user from the recipient list.

The reception unit 97 serves to receive answer messages from the recipients in the recipient list having received the first message packet. The answer message includes identification information of the recipient transmitting the answer message.

Next, the operation of the first message service providing apparatus 9 according to the second exemplary embodiment of the invention will be described with reference to FIG. 10.

First, the first user inputs a message and a list of recipients who will receive the message to the first message service providing apparatus 9. For example, identification information of the second to fourth message service providing apparatuses is input as the recipient list (S11).

Then, when a signal instructing the message to be transmitted is input, the packet generating unit 95 generates a first message packet including the message input by the first user and the identification information of the first user, and the transmission unit 96 multicasts the first message packet to the recipients in the recipient list (S12). That is, the first message packet is multicasted to the second to fourth message service providing apparatuses.

Subsequently, when an answer message is received from any one in the recipient list (S13), the packet generating unit 95 combines the received answer message with the message input by the first user to generate a second message packet (S14).

When a signal instructing the message to be transmitted is input after the second message packet is generated, the transmission unit 95 transmits the second message packet to the recipients in the recipient list (SI 5). Alternatively, the second message packet may be transmitted to a recipient individually designated from the recipient list or other recipients that are not included in the recipient list.

The recipient having received the second message packet, for example, the user of the second message service providing apparatus can confirm, at a look, messages which are written by other recipients, that is, the users of the third and fourth message service providing apparatuses.

Although the message service providing apparatus and the method of providing a message service according to the invention have been described hitherto with reference to the exemplified drawings, the invention is not limited to the exemplary embodiments described in this specification and the accompanying drawings but can be modified or changed by those skilled in the art without departing from the scope and spirit of the invention.

What is claimed is:

1. A communication apparatus providing common data service, the apparatus comprising:
    an input unit in which a user:
        inputs, in a first recipient field provided at the apparatus, identification (ID) information on a plurality of communication apparatuses;
        inputs first data to generate common data that includes the first data, in a data field provided at the apparatus; and
        selects, in a second recipient field provided at the apparatus, ID information on a second communication apparatus, which first receives the common data, that includes the first data, from among the ID information on the plurality of apparatuses input into the first recipient field, wherein the second communication apparatus of the plurality of apparatuses is the only apparatus, among the plurality of apparatuses, which receives the common data and the ID information on the plurality of apparatuses from the communication apparatus;
    a display unit that displays a menu list having a general message menu and a common message, displays the first recipient field for inputting the ID information on the plurality of apparatuses in response to the common message menu being selected, and displays the data field for inputting the first data and the second recipient field for selecting the ID information on the second communication apparatus of the plurality of apparatuses among the ID information on the plurality of apparatuses;
    a transmission unit that transmits the common data, that includes the first data, and the ID information on the plurality of apparatuses to only the second communication apparatus of the plurality of apparatuses using the selected ID information on the second communication apparatus;
    a packet generating unit which generates the common data by adding the first data; and
    a reception unit that receives answer data from the second communication apparatus of the plurality of apparatuses,
    wherein the packet generating unit is further configured to add the answer data to the common data that includes the first data,
    wherein the input unit is further configured to input, in the second recipient field displayed at the apparatus providing common data service, ID information on a third communication apparatus of the plurality of apparatuses that is permitted by the user to receive the common data that includes the first data and the answer data and to add the other data to the received common data, and
    wherein the transmitting unit is further configured to transmit the common data, that includes the first data and the answer data, and the ID information on the plurality of apparatuses to the other apparatus using the ID information on the third apparatus, and
    wherein the first data and the other data are data exchanged between wireless handheld devices through a short message service (SMS) or long message service (LMS) provided for the wireless handheld devices.

2. The apparatus of claim 1, wherein at least one of the first data and the answer data comprises at least one of a text message, a voice file, a music file, a still image file and a video file.

3. A communication apparatus providing common data service, the apparatus comprising:
    a reception unit that receives, from a first communication apparatus, common data, that includes first data, and identification (ID) information on a plurality of communication apparatuses, including the communication apparatus providing common data service, that are selected by a first user of the first apparatus to receive the common data, that includes the first data, and to add another data to the common data that includes the first data, wherein the communication apparatus is the only communication apparatus, from among the plurality of communication apparatuses selected by the first user of the first apparatus to receive the common data, which first receives the common data and the ID information on the plurality of communication apparatuses from the first communication apparatus, the ID information on the plurality of communication apparatuses including ID information on the first communication apparatus;

a display unit that displays objects corresponding to ID information on the plurality of apparatuses, a data field for inputting data and a first recipient field including the ID information on the plurality of apparatuses;

an input unit in which a user of the apparatus providing common data service:

selects an object corresponding to ID information on the communication apparatus providing common data service among the objects corresponding to the ID information on the plurality of apparatuses and inputs second data in the data field provided at the apparatus providing common data service to modify the common data that includes the first data so that the common data includes the second data in addition to the first data; and selects, at the first recipient field provided at the apparatus providing common data service, ID information on at least one other apparatus, among the ID information on the plurality of apparatuses except for the apparatus providing common data service, to transmit the common data that includes the first data and the second data to the at least one other apparatus of the plurality of apparatuses; and a transmission unit that transmits the common data, that includes the first data and the second data, and the ID information on the plurality of apparatuses to the at least one other apparatus using the ID information on the at least one other apparatus, wherein the first data are included in the common data by the first user at the first apparatus, wherein the first data and the second data are data exchanged between wireless handheld devices through a short message service (SMS) or long message service (LMS) provided for the wireless handheld devices, wherein the communication apparatus providing common service further comprises a control unit which deactivates the ID information on the first apparatus and the ID information on the communication apparatus providing common data service displayed in the first recipient field to prohibit the input unit from selecting the ID information on the first apparatus and the ID information on the apparatus providing common data service, and wherein the common data further includes third data added by a third apparatus.

4. The apparatus of claim 3, further comprising a control unit that protects the first data from being modified at the apparatus providing common data service.

5. The apparatus of claim 3, wherein at least one of the first data and the second data comprises at least one of a text message, a voice file, a music file, a still image file and a video file.

6. The apparatus of claim 3, further comprising a graphic user interface providing unit which indicates that the common data received at the reception unit do not include data input at an apparatus other than the first apparatus, among the plurality of apparatuses.

7. The apparatus of claim 3, further comprising a control unit that allows the user of the apparatus providing common data service to access the first data.

8. A method of providing a common data service using a first communication apparatus, the method comprising:

displaying a menu list having a general message menu and a common message menu at the first communication apparatus;

displaying, at the first apparatus, a first recipient field for inputting identification (ID) information in response to the common message menu being selected;

inputting, at the first apparatus, ID information on a plurality of communication apparatuses in the first recipient field provided at the first apparatus;

displaying, at the first apparatus, a data field;

inputting, at the first apparatus, first data in the data field provided at the first apparatus to generate common data that includes the first data;

displaying, at the first apparatus, a second recipient field including the ID information on the plurality of apparatuses;

selecting, at the first apparatus, ID information on a second communication apparatus of the plurality of apparatuses which first receives the first data, from among the displayed ID information on the plurality of apparatuses input into the first recipient field, in the second recipient field provided at the first apparatus, wherein the second communication apparatus of the plurality of apparatuses is the only apparatus, among the plurality of apparatuses, which receives the common data and the ID information on the plurality of apparatuses sent from the first communication apparatus;

transmitting the common data, that includes the first data, and the ID information on the plurality of apparatuses to the second communication apparatus of the plurality of apparatuses using the selected ID information on the second communication apparatus, whereby a second user of the second communication apparatus of the plurality of apparatuses receives the common data that includes first data and adds a second data to the common data that includes the first data; and receiving, at the first apparatus, answer data from the second communication apparatus of the plurality of apparatuses;

adding, at the first apparatus, the answer data to the common data that includes the first data;

inputting, at the first apparatus, ID information on a third communication apparatus included in the plurality of apparatuses that is permitted by a first user of the first apparatus to receive the common data, that includes the first data and the answer data, and to add the other data to the received common data, in the second recipient field provided at the first apparatus; and transmitting the common data, that includes the first data and the answer data, and the ID information on the plurality of apparatuses to the third apparatus using the ID information on the other apparatus, wherein the first data and the second data are data exchanged between wireless handheld devices through a short message service (SMS) or long message service (LMS) provided for the wireless handheld devices.

9. The method of claim 8, wherein at least one of the first data and the answer data comprises at least one of a text message, a voice file, a music file, a still image file and a video file.

10. A method of providing a common data service using a communication apparatus, the method comprising:

receiving, at the communication apparatus from a first apparatus, common data, that includes first data, and identification (ID) information on a plurality of communication apparatuses including the communication apparatus that are selected by a first user of the first apparatus to receive the common data, that includes the first data, and to add another data to the common data that includes the first data, wherein the communication apparatus is the only communication apparatus, from among the plurality of communication apparatuses selected by the first user of the first apparatus to receive the common data, which first receives the common data and the ID information on the plurality of communication apparatuses from the first apparatus, the ID information on the plurality of communication apparatuses including ID information on the first apparatus;

displaying, at the communication apparatus, objects corresponding to ID information on the plurality of apparatuses and selecting an object corresponding to ID information on the communication apparatus;

displaying, at the communication apparatus, a data field for inputting data;

inputting, by a second user at the communication apparatus, second data in the data field provided at the communication apparatus to modify the common data that includes the first data so that the common data includes the second data in addition to the first data;

displaying, in a first recipient field provided at the communication apparatus, the ID information on the plurality of apparatuses;

selecting, by the second user at the communication apparatus, ID information on at least one other apparatus of the plurality of apparatuses, among the displayed ID information on the plurality of apparatuses, to transmit the common data that includes the first data and the second data, at the first recipient field provided at the communication apparatus to the at least one other apparatus of the plurality of apparatuses; and transmitting the common data, that includes the first data and the second data, and the ID information on the plurality of apparatuses to the at least one other apparatus using the selected ID information on the at least one other apparatus, wherein the first data are included in the common data by the first user at the first apparatus, wherein the first data and the second data are data exchanged between wireless handheld devices through a short message service (SMS) or long message service (LMS) provided for the wireless handheld devices, wherein the ID information on the first apparatus and the ID information on the communication apparatus displayed in the first recipient field are deactivated so that the ID information on the first apparatus and the ID information on the communication apparatus cannot be selected, and wherein the common data further includes third data added by a third apparatus.

11. The method of claim 10, wherein the first data is protected from modification at the communication apparatus.

12. The method of claim 10, wherein at least one of the first data and the second data comprises at least one of a text message, a voice file, a music file, a still image file and a video file.

13. The method of claim 10, wherein a user interface (UI) of the communication apparatus indicates that the common data, that includes the first data, do not include data input at an apparatus other than the first apparatus, among the plurality of apparatuses.

14. The method of claim 10, wherein at least one of the first data and the second data is a short text message, and wherein at least one of the first data and the second data is attached by at least one of a voice file, a music file, a still image file and a video file.

15. A computer-readable memory storing a program for performing a method of providing a common data service using a communication apparatus, the method comprising:

receiving, at the communication apparatus from a first apparatus, common data, that includes first data, and identification (ID) information on a plurality of communication apparatuses including the communication apparatus that are selected by a first user of the first apparatus to receive the common data, that includes the first data, and to add another data to the common data that includes the first data, wherein the communication apparatus is the only communication apparatus, from among the plurality of communication apparatuses selected by the first user of the first apparatus to receive the common data, which first receives the common data and the ID information on the plurality of communication apparatuses from the first apparatus, the ID information on the plurality of communication apparatuses including ID information on the first apparatus;

displaying, at the communication apparatus, objects corresponding to ID information on the plurality of apparatuses and selecting an object corresponding to ID information on the communication apparatus;

displaying, at the communication apparatus, a data field for inputting data;

inputting, by a second user at the communication apparatus, second data in the data field provided at the communication apparatus to modify the common data that includes the first data so that the common data includes the second data in addition to the first data;

displaying, in a first recipient field provided at the communication apparatus, the ID information on the plurality of apparatuses;

selecting, by the second user at the communication apparatus, ID information on at least one other apparatus of the plurality of apparatuses, among the displayed ID information on the plurality of apparatuses, to transmit the common data that includes the first data and the second data, at the first recipient field provided at the communication apparatus to the at least one other apparatus of the plurality of apparatuses; and transmitting the common data, that includes the first data and the second data, and the ID information on the plurality of apparatuses to the at least one other apparatus using the selected ID information on the at least one other apparatus, wherein the first data are included in the common data by the first user at the first apparatus, wherein the first data and the second data are data exchanged between wireless handheld devices through a short message service (SMS) or long message service (LMS) provided for the wireless handheld devices, wherein the ID information on the first apparatus and the ID information on the communication apparatus displayed in the first recipient field are deactivated so that the ID information on the first apparatus and the ID information on the communication apparatus cannot be selected, and wherein the common data further includes third data added by a third apparatus.

* * * * *